US005869601A

United States Patent [19]

Svoboda

[11] Patent Number: 5,869,601

[45] **Date of Patent: *Feb. 9, 1999**

[54] METHOD OF STABILIZING THE VISCOSITY OF A THICKENED COMPOSITION

[75] Inventor: George J. Svoboda, Whitefish Bay, Wis.

[73] Assignee: S. C. Johnson & Son, Inc., Racine, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 628,393

[22] Filed: Apr. 5, 1996

[51] Int. Cl.[6] ........................................ C08J 3/03

[52] U.S. Cl. .......................... 528/480; 523/305; 523/318; 252/321

[58] Field of Search .................................... 523/305, 318, 523/330; 528/480

[56] References Cited

U.S. PATENT DOCUMENTS

| | | | |
|---|---|---|---|
| 3,891,593 | 6/1975 | Smithemon, Jr. et al. | 523/318 |
| 5,130,043 | 7/1992 | Prince et al. | 252/95 |

FOREIGN PATENT DOCUMENTS

| | | |
|---|---|---|
| 0 517 309 A1 | 12/1992 | European Pat. Off. . |
| 1178524 | 7/1989 | Japan . |

*Primary Examiner*—Tae Yoon
*Attorney, Agent, or Firm*—Laura L. Bozek

[57] ABSTRACT

A method of stabilizing a composition containing a thickening agent which is adversely affected by the increasing ionic strength of the composition, by blanketing the solution in a vessel with a sufficient amount of gas capable of diluting or displacing the atmospheric air in the headspace of the vessel.

12 Claims, No Drawings

METHOD OF STABILIZING THE VISCOSITY OF A THICKENED COMPOSITION

BACKGROUND OF THE INVENTION

1. Field of the Invention

The present invention relates generally to a method of stabilizing the viscosity of thickened compositions. In particular, the present invention relates to a method of stabilizing the viscosity of aqueous compositions for cleaning glass, porcelain, metal, laundry, carpeting, upholstery, shampoo and air fragrancing.

2. Brief Description of the Background Art

Thickened compositions are highly desirable for a variety of consumer products such as air fragrancing compositions, laundry, liquid dishwashing detergents, shampoo, oven cleaning, upholstery and carpet cleaning. It has been observed that these thickened compositions may lose viscosity during manufacturing due, in part, to the shearing and aeration of compositions during preparation, transfer, storage and filling operations into bottles and other dispensing containers. Thus, it is important to maintain a sufficiently high viscosity prior to filling in order to achieve the desired viscosity of the finished product.

Applicant has observed that some thickened compositions also experience viscosity losses within one hour from making the composition. When the compositions were left overnight in storage vessels, the viscosity losses were significant. Smaller volumes of composition appear to be more greatly affected, potentially due to large surface area to volume relationship. For example, a 1200 ml. beaker containing 200 ml. of product having an initial viscosity of about 100 centipoise ("cps") lost approximately 40 cps after only 6 hours of storage, while a storage container containing 5000 gallons (about 18.9 kiloliters) of the same product lost approximately 10 cps after about 16 hours of storage. Attempts to compensate for this viscosity loss by increasing the levels of thickening agents in the composition have proven inadequate for certain consumer products. For example, increasing the levels of thickening agents in glass cleaners can produce undesirable streaking from the increased residue on the glass surface.

SUMMARY OF THE INVENTION

Accordingly, it is an object of the present invention to provide a method of substantially maintaining the viscosity of thickened compositions without adversely affecting other desired properties.

This object and others are provided by a method of substantially maintaining the viscosity a composition comprising the steps of introducing a sufficient amount of at least one gas into a vessel capable of substantially displacing the atmospheric air in the vessel, and introducing a composition into the vessel, the composition comprising at least one thickening agent adversely affected by the increasing ionic strength of the composition. Preferably, a sufficient amount of at least one gas capable of diluting or displacing atmospheric air may also be introduced into the composition to substantially remove any atmospheric air entrapped in the composition.

MODES OF CARRYING OUT THE INVENTION

The above features and advantages are provided by the present invention which relates most generally to a method of stabilizing the viscosity of a thickened composition comprising the steps of introducing a sufficient amount of gas into a vessel capable of substantially displacing the atmospheric air in the vessel; and introducing a composition into the vessel, the composition comprising at least one thickening agent adversely affected by the increasing ionic strength of the composition. Preferably, a sufficient amount of at least one gas capable of diluting or displacing atmospheric air may also be introduced into the composition to substantially remove any atmospheric air entrapped in the composition.

Without being held to any theory, Applicant believes that the exposure of the thickened composition to atmospheric air, principally carbon dioxide, is the primary cause of viscosity reduction. Carbon dioxide is dissolved in the solution and undergoes several reactions which results in an increase of the solution's ionic strength. Since the viscosity loss appears to occur when compounds capable of forming ionic compounds are present in the composition, it is believed that the carbon dioxide forms ionic compounds such as carbonates and bicarbonates and can also react with amine containing compounds such as ammonium hydroxide to form carbamates. Other ionic compounds may form with alkalinity adjusting agents such as sodium hydroxide and potassium hydroxide. The formation of ionic compounds increases the ionic strength of the compositions. The thickeners are adversely affected by increasing ionic strength, thus the viscosity of the compositions containing these thickeners begins to decrease.

This invention relates to the discovery that by reducing or inhibiting the exposure of the thickened compositions to atmospheric air, the viscosity can be substantially maintained with minimum loss until additional processing, such as filling operations, can be achieved. Specifically, the reduction of exposure to atmospheric air may be achieved by "blanketing" the composition with gas. During the blanketing process, the gas acts as a barrier between the atmospheric air and the composition. The gas substantially displaces the atmospheric air by dilution until the concentration of the atmospheric air is so low as to have a negligible affect on the composition.

Gases which can be utilized in the present invention include industrial inert gases such as nitrogen, argon, helium, xenon, and mixtures thereof. Utilizing compressed air substantially free of carbon dioxide, or scrubbing the carbon dioxide from the air at the usage site can also be effective Nitrogen is a preferred gas due to its relative cost, commercial availability and ease of storage. Argon is also preferred because it is a more dense gas than atmospheric air or nitrogen, thus expected to achieve a more efficient blanket effect. Conversely, helium is less preferred since it is less dense than atmospheric air. Oxygen may also be suitable for use with this method, however, it is not preferred because it actively supports combustion, and may explode upon contact with heat or oxidizable materials. Radon is also not preferred because of its high toxicity.

The method of the present invention requires that a sufficient amount of gas be introduced to substantially displace atmospheric air in the vessel containing the thickened composition. This amount can be calculated using the following exponential dilution equation:

$$[C]=C_o \exp^{-(Ft/v)}$$

wherein $[C]$=concentration of gas to be displaced, $[C_o]$=initial concentration of gas to be displaced,

[F]=flow rate of inert (diluent) gas,

[t]=length of time for displacement, and

[V]=displacement volume.

For example, the displacement of 50% carbon dioxide from a 100 liter storage vessel in 60 minutes would require a flow rate of about 1.2 liters per minute into the vessel.

The viscosity of the composition is provided, in part, by at least one thickening agent such as a natural or synthetic polymer which is adversely affected by increasing ionic strength of the composition. Typical synthetic polymers which are adversely affected by increasing ionic strength include, but are not limited to, polyacrylic acid polymers available under the tradenames Acritamer 501E, Acritamer 504E, Acritamer 505E, Acritamer 934, Acritamer 940 and Acritamer 941 from R.I.T.A. Corp. and Novaprint AB, Novaprint AV, Novaprint CL, Novaprint HV, Novaprint K, Novaprint LR and Novaprint WF from 3-V Inc.; acrylic copolymers available under the tradename Acusol 830 from Rohm and Haas Co. and Alcogum L from Alco Chemical Corp.; associative acrylic copolymers such as Acusol 820 and Acusol 823 from Rohm and Haas; crosslinked polyacrylic acid polymers such as Carbopol® ETD 2020, Carbopol® ETD 2001, Carbopol® ETD 2690, Carbopol® ETD 2691, Carbopol® ETD 2623, Carbopol ®ETD 2050, Carbopol ®643, Carbopol®645, Carbopol®647, Carbopol®676, Carbopol® 681-X1, Carbopol® 691, Carbopol® 694, Carbopol ® 934 and 934P, Carbopol® 940 and 941, Carbopol® 980 and 981 and Carbopol® 1382, Carbopol ® 1623, Carbopol® 2984 and Carbopol® 5984 available from B. F. Goodrich Co.. For glass cleaning compositions, for example, the polymer is a polyacrylic acid copolymer available under the tradename Carbopol® ETD 2623 from B. F. Goodrich Co. These polymers must be neutralized in order to impart their maximum viscosity potential.

Other thickeners which are negatively impacted by increasing the ionic strength of the compositions include bentonite-based materials such as Bentolite® available from Southern Clay Products; montmorillonite compounds such as Gelwhite® available from Southern Clay Products; hectorite compounds such as Laponite® RD, Laponite® RDS, Laponite® XLG, Laponite® XLS and Laponite® 508 from Southern Clay Products; and magnesium aluminum silicates available under the tradenames Van Gel B and Veegum from R. T. Vanderbilt Co., Inc. These natural thickeners may also be combined with thickeners which are not affected to a great extent by ionic strength but may act in synergy with polymers that are affected by ionic strength.

Typically the thickening agent is present in any amount desired depending on the type of composition. For example, for a glass cleaning composition, the polymer is generally present in an amount of less than 0.1 total weight (hereinafter, all amounts are given in weight percent unless specified otherwise). It has been observed that the viscosity loss is greater and occurs at faster rate for compositions containing very low amounts of thickeners.

The compositions to be used with the inventive method are generally alkaline if the above-described polymer is used. Generally, however, the pH of the composition is above 7, more preferably from about 8–13 and ideally from 8–11.

The pH may be adjusted with an alkalinity agent including, but not limited to, amines or alkali metal bases, such as sodium hydroxide and potassium hydroxide. Preferably, the alkalinity agent is selected from amine containing compounds such as monoethanolamine, triethanolamine, and ammonia. Amine containing alkalinity agents are preferred in cleaning compositions because their volatilization properties reduces the likelihood of residue (streaking) on the treated surface.

The balance of the thickened composition to be used with the method of the present invention may be aqueous or non-aqueous solvent. Preferably, the composition is aqueous. For example, for a glass cleaning composition, the aqueous composition will generally contain an amount of water in the range from about 50 to about 99.5 total weight percent, and preferably from about 85 to about 98 total weight percent.

Non-aqueous solvents may also be mixed with aqueous compositions by the addition, for example, of alcohols, glycols, glycol ethers and the like. On the other hand, such non-aqueous solvents may be employed in the thickened compositions without the presence of water if so desired.

Preferably, the amount of detrimental exposure to atmospheric air may be further minimized during production of the thickened compositions by precautionary exclusion means such as pulling a vacuum or covering the mixing and storage vessels of individual components as well as the final composition. This exclusion is most practically achieved by covering the storage and mixing vessels with a lid. It should also be noted that the exposure of the final product to atmospheric air may be minimized, by completely filling the dispenser with product.

More preferably, the amount of detrimental exposure of the composition to atmospheric air may be even further minimized by introducing into the composition, a sufficient amount of at least one gas capable of displacing or diluting the atmospheric air in the composition. It is believed that the deleterious atmospheric air, such as the carbon dioxide component is dissolved in the composition. Once the diluent gas is introduced to the solution, the carbon dioxide trapped therein will attempt to achieve equilibrium with the diluent gas as the gas passes through the composition. The carbon dioxide is absorbed by the diluent gas and taken out of the composition. Because of this mechanism, it is preferred that the diluent gas be introduced at the lower portion of the vessel containing the composition. In addition, since carbon dioxide has a lower dissolution rate in water at higher temperatures, it is preferred that the composition be stored at or above ambient temperature of about 25° C.

Generally, the diluent gas may be introduced by "sparging" the gas into the composition. Sparging is defined as the spraying or bubbling of the gas into the composition. Sparging may be accomplished by any conventional means such as typical dispersion tube devices. It should be noted that sparging is impractical for compositions which are likely to generate foam.

The same diluent gases which are appropriate for the blanketing process can also be utilized for introduction into the composition. The amount of gas sufficient to displace or dilute the atmospheric air in the composition may be calculated using the above-described exponential dilution equation.

One preferred method of the invention involves the following steps. First, a covered storage vessel was filled almost completely with water at ambient temperature. Next, the storage vessel was purged with nitrogen gas using a conventional pressure system at from about 2.0–2.5 psig while draining the water from the vessel. Then, while maintaining a constant pressure of about 2.0 psig, a glass cleaning composition containing unneutralized thickener was added to the storage vessel. The composition was then neutralized to a pH of about 10.3 with an alkalinity adjusting agent. The viscosity of the glass cleaning composition (according to the below formula) after neutralization was about 90 cps. The viscosity of the composition after approximately 15 hours in the storage vessel under about 2 psig of nitrogen was 90 cps.

| Glass Cleaning Composition | |
|---|---|
| Sodium lauryl sulfate (29% active) | 0.2670 |
| Ethylene glycol n-hexyl ether | 0.6000 |
| Ethylene glycol n-butyl ether | 0.8000 |
| Fluoro anionic surfactant (Fluorad ® FC-129) | 0.0125 |
| Carbopol ® ETD 2623 | 0.0700 |
| Propylene glycol | 0.1250 |
| Fragrance | 0.0417 |
| Dye | 0.0022 |
| Ammonia (30% active) | 0.3500 |
| Deionized water | balance |

Industrial Applicability

Accordingly, the method of the present invention can be with a multitude of thickened commercial products such as compositions, laundry, liquid dishwashing detergents, shampoo, oven cleaning, upholstery and carpet cleaning compositions. Advantageously, this method substantially maintains the viscosity of the compositions during storage of product without adversely affecting other desired properties.

Although the present invention has been illustrated with reference to certain preferred embodiments, it will be appreciated that the present invention is not limited to the specifics set forth therein. Those skilled in the art readily will appreciate numerous variations and modifications within the spirit and scope of the present invention, and all such variations and modifications are intended to be covered by the present invention which is defined by the following claims.

I claim:

1. A method of substantially maintaining the viscosity of a composition comprising the steps of:

introducing a sufficient amount of diluent gas into a vessel to substantially displace the carbon dioxide in the vessel;

introducing a composition into the vessel, the composition comprising at least one thickening agent adversely affected by increasing the ionic strength of the composition, the introduced gas reducing the ionic strength of the composition by removal of the carbon dioxide effecting an increase in ionic strength; and further introducing a sufficient amount of diluent gas into said composition so as to substantially remove entrapped atmospheric air from the composition.

2. The method of substantially maintaining viscosity according to claim 1, wherein the gas is selected from the group consisting of argon, nitrogen, oxygen, helium, xenon and mixtures thereof.

3. The method of stabilizing viscosity according to claim 1, wherein the gas is introduced into the composition at the lower portion of the vessel.

4. The method of stabilizing the viscosity according to according to claim 3, wherein the gas is selected from the group consisting of argon, nitrogen, oxygen, helium, xenon and mixtures thereof.

5. The method of stabilizing the viscosity according to according to claim 3, wherein the vessel contains a cover.

6. The method according to claim 1, wherein the thickening agent is selected from the group consisting of synthetic polymers, natural thickeners and mixtures thereof.

7. The method according to claim 6, wherein the polymer is a mixture of polyacrylic acid polymers and copolymers.

8. A method of substantially maintaining the viscosity of a composition comprising the steps of:

introducing water into a vessel;

introducing a sufficient amount of a diluent gas into the vessel to substantially displace the atmospheric air in the vessel;

introducing a composition into the vessel, the composition comprising at least one thickening agent adversely affected by increasing the ionic strength of the composition; and further introducing a sufficient amount of diluent gas into said composition so as to substantially remove entrapped atmospheric air from the composition;

the introduced diluent gas reducing the ionic strength of the composition by removal of the carbon dioxide present in said atmospheric air in said vessel and in said composition which would result in an increase in ionic strength.

9. The method according to claim 8, wherein the thickening agent is selected from the group consisting of synthetic polymers, natural thickeners and mixtures thereof.

10. The method according to claim 9, wherein the polymer is selected from the group consisting of polyacrylic acid copolymers, polyacrylic acid copolymers and mixtures thereof.

11. The method according to claim 8, wherein the gas is selected from the group consisting of argon, nitrogen, helium, xenon and mixtures thereof.

12. The method according to claim 8, wherein the gas is nitrogen.

* * * * *